United States Patent
Zhang et al.

(10) Patent No.: US 7,801,660 B2
(45) Date of Patent: Sep. 21, 2010

(54) METHODS AND SYSTEMS FOR ESTIMATING COMPRESSOR FOULING IMPACT TO COMBINED CYCLE POWER PLANTS

(75) Inventors: Yanda Zhang, Elk Grove, CA (US); Peter Pechtl, Graz (AT); Josef Petek, Stattegg (AT)

(73) Assignee: General Electric Company, Schenectady, NY (US)

( * ) Notice: Subject to any disclaimer, the term of this patent is extended or adjusted under 35 U.S.C. 154(b) by 963 days.

(21) Appl. No.: 11/461,055

(22) Filed: Jul. 31, 2006

(65) Prior Publication Data

US 2008/0027616 A1   Jan. 31, 2008

(51) Int. Cl.
 G06F 19/00 (2006.01)
(52) U.S. Cl. ............... 701/99; 701/1; 701/100; 415/13; 415/17; 415/20; 415/26; 60/39.182; 60/772
(58) Field of Classification Search ............ 701/1, 701/99, 100; 702/1, 127, 182, 187, 189, 702/33, 34
See application file for complete search history.

(56) References Cited

U.S. PATENT DOCUMENTS

| | | | |
|---|---|---|---|
| 6,883,527 B2* | 4/2005 | Travaly et al. | 134/22.18 |
| 7,017,079 B2* | 3/2006 | Gulati et al. | 714/25 |
| 7,050,943 B2* | 5/2006 | Kauffman et al. | 702/188 |
| 7,200,997 B2* | 4/2007 | Carlson et al. | 60/775 |
| 7,251,582 B2* | 7/2007 | Singh et al. | 702/183 |
| 7,383,167 B2* | 6/2008 | Oke | 703/18 |
| 2003/0065436 A1* | 4/2003 | Hyakutake et al. | 701/100 |
| 2003/0083827 A1* | 5/2003 | Chow et al. | 702/34 |
| 2005/0182576 A1* | 8/2005 | Smith | 702/45 |
| 2005/0267710 A1* | 12/2005 | Heavner et al. | 702/183 |
| 2007/0240400 A1* | 10/2007 | Smith et al. | 60/39.182 |

OTHER PUBLICATIONS

Snarheim et al. Control Design for a Gas Turbine Cycle with CO2 Capture Capabilities, 2006, Internet, p. 1-10.*
Chiesa et al. Using Hydrogen as Gas Turbine Fuel, 2005, Internet, p. 1-8.*
Gong et al., Analysis of Radial Compressor Options for Supercritical CO2 Power Conversion Cycles, 2006, Internet, p. 1-46.*
Gay et al., Economic Evaluation of Plant Upgrades Using Plant Optimization Software, 2000, Internet, p. 1-16.*

(Continued)

*Primary Examiner*—Khoi Tran
*Assistant Examiner*—Jonathan L Sample
(74) *Attorney, Agent, or Firm*—Sutherland Asbill & Brennan LLP (57) ABSTRACT

A system and method for estimating the impact of compressor fouling in a combined cycle power block. The current performance of the combined cycle power block is determined and normalized to one or more reference conditions. A baseline performance of a gas turbine of the combined cycle power block is also determined. A predicted performance of the combined cycle power block is then determined by substituting the baseline performance of the gas turbine for the current performance of the gas turbine. A recoverable impact to the combined cycle power block due to compressor fouling is then determined by subtracting the normalized current performance from the predicted performance and a recoverable impact to the fuel consumption of the combined cycle power block is determined from the recoverable impact.

20 Claims, 9 Drawing Sheets

OTHER PUBLICATIONS

Larson et al. A cost-benefit assessment of BLGCC technology, 2000, Internet, p. 1-16.*

Chiang et al., A Novel Concept for Reducing Water Usage and Increasing Efficiency in Power Generation, 2004, Internet, p. 1-35.*

* cited by examiner

METHODS AND SYSTEMS FOR ESTIMATING COMPRESSOR FOULING IMPACT TO COMBINED CYCLE POWER PLANTS

FIELD OF THE INVENTION

The present invention relates generally to methods and systems for estimating compressor fouling impact in a power plant.

BACKGROUND OF THE INVENTION

During the operation of a gas turbine, turbine capacity and efficiency losses may result from compressor fouling. Compressor fouling may be caused by the buildup of airborne salt, dirt, or other particles on the blades of the gas turbine. Such foulant deposits on the turbine blades may result in severe performance deterioration. The effect of compressor fouling may be a drop in the airflow, pressure ratio, and compressor efficiency of the gas turbine, resulting in a drop in power output and thermal efficiency. Performance deterioration may further lead to increased fuel consumption and higher operating costs.

The gas turbine capacity and efficiency losses may be restored by an offline compressor wash in which the gas turbine is shut down and the turbine blades are cleaned. When performed correctly, an offline compressor wash may typically restore virtually one hundred percent of the lost power and efficiency attributed to compressor fouling. Thus, profitability losses created by compressor fouling may be minimized by effective offline compressor washing.

In order to perform an offline compressor wash, however, the gas turbine must be shut down. Accordingly, the gas turbine may not be used to generate power during the time that it takes to perform the offline compressor wash. While the gas turbine is offline, the power facility is losing potential revenue and profitability that could be achieved by selling the power generated by the gas turbine. Given the profitability losses created both by compressor fouling and by the time and expense needed to perform an offline compressor wash, it is desirable to optimize the offline compressor wash schedule in order to minimize profitability losses.

Currently, offline compressor washing of a gas turbine may be set according to a schedule generated by the manufacturer or vendor of the gas turbine. These preset schedules, however, typically do not take into account the different operating conditions which may exist for different gas turbines. For example, a particular gas turbine may need to be washed more often because it is operated in a salt air environment and heavy salt deposits form on the turbine blades. Additionally, offline compressor washing may not be needed as often if online compressor washing is performed on the gas turbine. Online compressor washing may be performed without shutting down the gas turbine, and it may further extend the operating period of the gas turbine between shutdowns for offline compressor washing. Accordingly, if online compressor washing is performed on a gas turbine, offline compressor washing may be needed less often.

Prior art systems are currently available that estimate the degradation of a gas turbine due to compressor fouling to determine the most optimum time to perform an offline compressor wash of the gas turbine. These prior art systems, however, do not consider the complexity of a combined cycle power plant. A combined cycle power plant typically recovers heat from a gas turbines exhaust, uses the heat to generate steam in a heat recovery steam generator, and then uses the steam to generate electricity in a steam turbine. The effect that gas turbine compressor fouling has on the overall system performance is typically not the same as the effect that it has on the gas turbine alone because the exhaust energy of the gas turbine must also be considered in a combined cycle power plant. The exhaust energy, which is also affected by compressor fouling, may be recovered by a heat recovery steam generator, which generates steam to drive a steam turbine. Furthermore, the complexity of determining compressor fouling impact in a combined cycle power plant may be compounded by the presence of more than one gas turbine in the combined cycle power plant. The prior art systems and methods of determining the most optimum time to perform an offline compressor wash are not appropriate for use in a combined cycle power plant.

Therefore, there exist a need in the art for a method and system for estimating compressor fouling impact to a combined cycle power plant in order to optimize the offline compressor washing of a gas turbine in the combined cycle power plant.

SUMMARY OF THE INVENTION

According to one embodiment of the invention, there is disclosed a method for estimating compressor fouling impact in a combined cycle power plant. The current performance of a combined cycle power plant is determined and normalized to one or more reference conditions. A baseline performance of a gas turbine of the combined cycle power plant is determined and used to determine a predicted performance of the combined cycle power plant. The predicted performance of the combined cycle power plant is the normalized current performance of the combined cycle power plant with the baseline performance of the gas turbine substituted for the current performance of the gas turbine. A recoverable impact to the performance of the combined cycle power plant is then calculated by subtracting the normalized current performance of the combined cycle power block from the predicted performance, and the recoverable impact to performance is used to determine a recoverable impact to fuel consumption.

According to another embodiment of the invention, there is disclosed a system for estimating compressor fouling impact in a combined cycle power plant. One or more monitoring devices coupled to a combined cycle power plant collect current performance data associated with the combined cycle power plant. A control unit in communication with the one or more monitoring devices receives the current performance data and stores it in a memory. The memory is also used to store predicted performance data associated with the combined cycle power block. The control unit further includes program logic that performs the steps of normalizing the current performance data to one or more reference conditions, calculating a recoverable impact to the performance of the combined cycle power plant due to compressor fouling, and calculating a recoverable impact to the fuel consumption of the combined cycle power plant based on the recoverable impact to the performance. The program logic calculates the recoverable impact to the performance by subtracting the normalized current performance of the combined cycle power plant from the predicted performance of the combined cycle power plant.

Aspects of the invention described below apply to both the method and system for estimating compressor fouling in a combined cycle power plant. According to one aspect of the present invention, a predicted or baseline performance of the gas turbine is used to determine a predicted performance of the combined cycle power plant. The predicted or baseline performance of the gas turbine is determined by first determining a performance of the gas turbine at a point in time close to and following a most recent maintenance of the gas turbine and then normalizing the performance of the gas turbine to one or more reference conditions. According to another aspect of the present invention, the baseline performance of the gas turbine may be adjusted according to a recovery variable.

According to another aspect of the present invention, the current performance of the combined cycle power plant includes a current performance of at least one gas turbine and the current performance of at least one steam turbine. The current performance of the at least one gas turbine is determined by at least one of: a current power output of the at least one gas turbine, a current heat rate of the at least one gas turbine, a current exhaust temperature of the at least one gas turbine, and a current exhaust flow of the at least one gas turbine. The current performance of the at least one steam turbine is determined by at least one of: a current power output of the at least one steam turbine, a derivative of steam power produced with respect to an exhaust temperature of the at least one gas turbine, and a derivative of steam power produced with respect to an exhaust flow of the at least one gas turbine.

According to yet another aspect of the present invention, the one or more reference conditions are defined by a user of the present invention. According to another aspect of the present invention, a point in time in which maintenance needs to be performed on the gas turbine is determined. According to another aspect of the present invention, when it is determined that maintenance is needed, a corrective action is taken, wherein the corrective action includes one of setting off an alarm, transmitting an alarm signal, shutting off the gas turbine, or scheduling a maintenance of the gas turbine.

According to yet another aspect of the present invention, calculating a recoverable impact to the fuel consumption of the combined cycle power plant includes the steps of determining a performance of the gas turbine following a proposed maintenance to the gas turbine, calculating a fuel consumption of the gas turbine following the proposed maintenance, and subtracting the calculated fuel consumption of the gas turbine from a current fuel consumption of the gas turbine.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention is described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams support combinations of means for performing the specified functions, combinations of steps for performing the specified functions and program instruction means for performing the specified functions. It will also be understood that each block of the block diagrams, and combinations of blocks in the block diagrams, can be implemented by special purpose hardware-based computer systems that perform the specified functions or steps, or combinations of special purpose hardware and computer instructions.

The inventions may be implemented through an application program running on an operating system of a computer. The inventions also may be practiced with other computer system configurations, including hand-held devices, multi-processor systems, microprocessor based or programmable consumer electronics, mini-computers, mainframe computers, etc.

Application programs that are components of the invention may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network. Exemplary embodiments of the present invention will hereinafter be described with reference to the figures, in which like numerals indicate like elements throughout the several drawings.

According to an aspect of the present invention, the impact of compressor fouling in a combined cycle power plant is determined. The present invention may determine the capacity loss of the gas turbine and the combined cycle power block due to compressor fouling. Additionally, if a greater amount of gas turbine capacity is required to generate the same power output of a clean gas turbine, the present invention may determine the increase in system fuel costs attributable to compressor fouling. Accordingly, an optimum schedule for performing an offline compressor wash of the gas turbine may be generated by the present invention.

Figure 1:
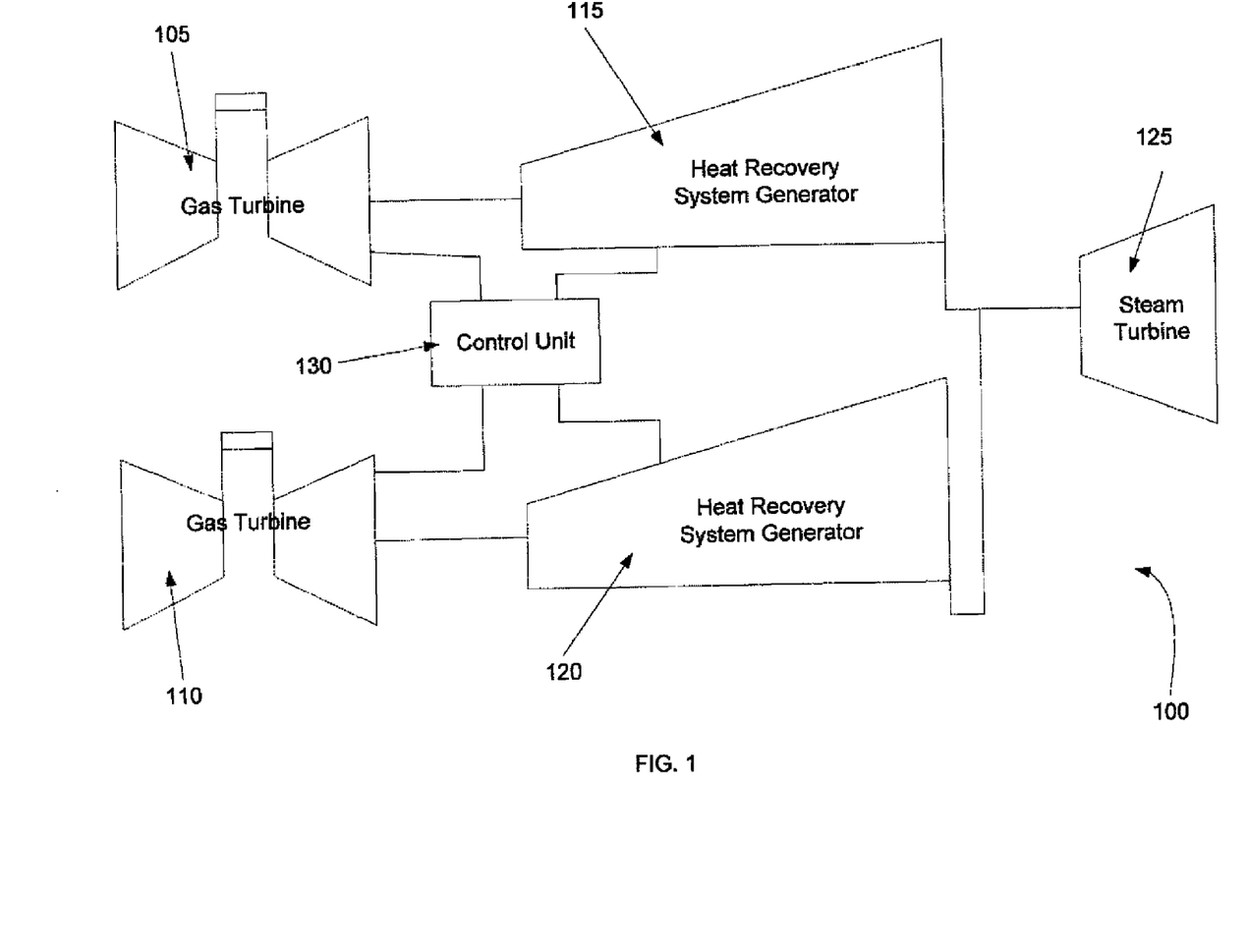
FIG. 1 is a schematic diagram of a combined cycle power block implementing a method and system for determining compressor fouling impact, according to an illustrative embodiment of the present invention.

FIG. 1 is a schematic diagram of a combined cycle power block 100 implementing a method and system for determining compressor fouling impact, according to an illustrative embodiment of the present invention. The combined cycle power block 100 may include one or more gas turbines 105, 110. It will be understood be those of skill in the art that a combined cycle power block 100 may include any number of gas turbines. As the gas turbines 105, 110 generate power, the exhaust from the gas turbines 105, 110 may be collected in heat recovery system generators (HRSG) 115, 120. According to FIG. 1, the exhaust from a first gas turbine 105 may be collected in a first HRSG 115, and the exhaust from a second gas turbine 11 may be collected in a second HRSG 120. The HRSG's 115, 120 may recover heat from the exhaust and use the heat to generate steam. This steam may then be used to drive a steam turbine 125 in order to generate additional power in the combined cycle power block 100. While FIG. 1 depicts two HRSG's 115, 120 and one steam turbine 125, it will be understood by those of ordinary skill in the art that a combined cycle power block 100 may include any number of HRSG's and steam turbines.

Still referencing FIG. 1, a control unit 130 may control the operation of the combined cycle power block 100. According to an aspect of the present invention, and described in greater detail below with reference to FIG. 3-9, the control unit 130 may determine the current impact of compressor fouling in the gas turbines 105, 110 on the performance of the combined cycle power block 100. The control unit 130 may further determine the total impact of compressor fouling on the performance of the combined cycle power block 100. Based on the total impact of compressor fouling in one or more of the gas turbines 105, 110, the control unit 130 may determine the optimum point in time at which an offline compressor wash should be scheduled for one or more of the gas turbines 105, 110.

Figure 2:
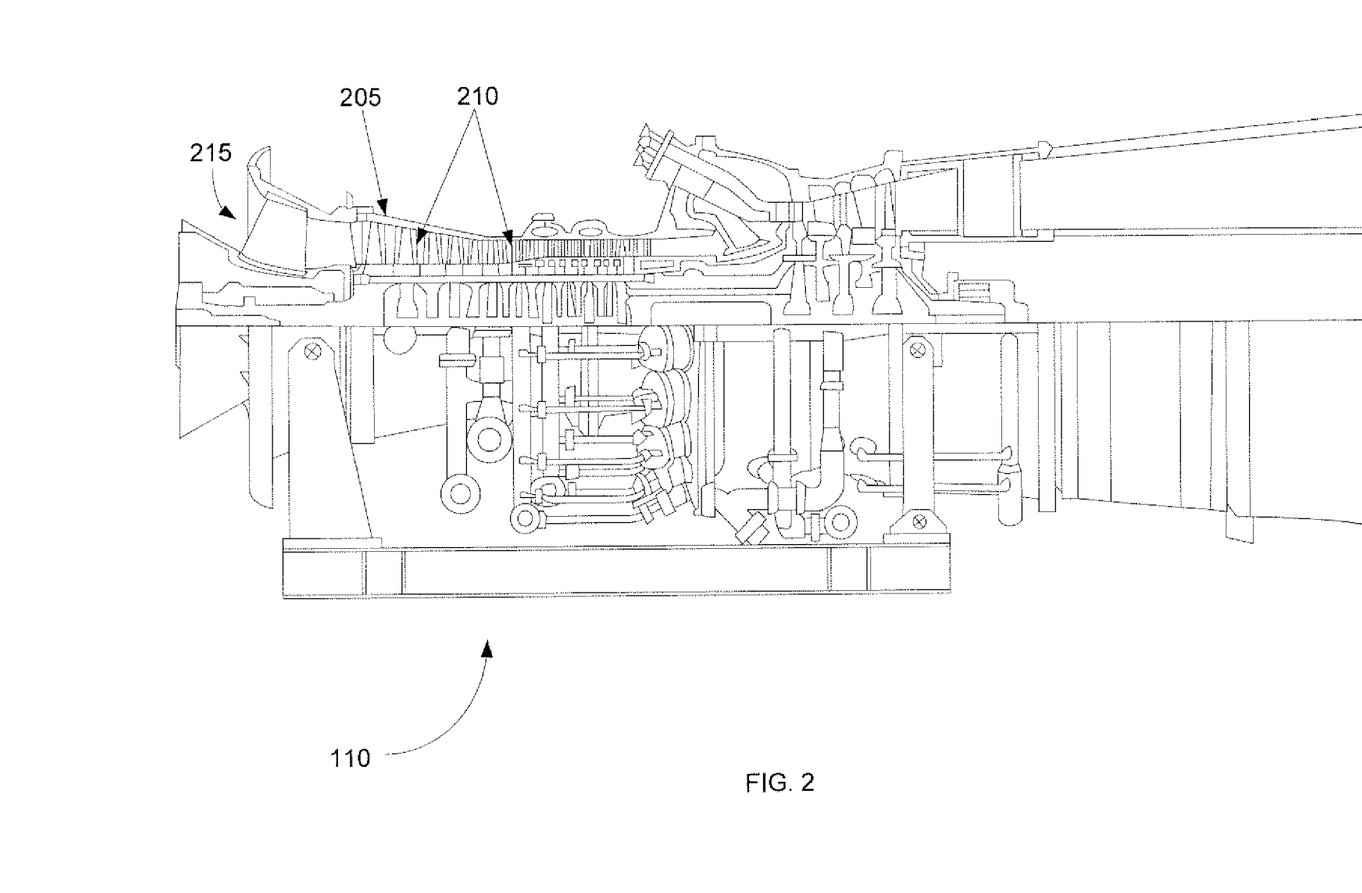
FIG. 2 is a partial cross-sectional view of a gas turbine used in a combined cycle power plant, according to an illustrative embodiment of the present invention.

FIG. 2 is a partial cross-sectional view of a gas turbine 105 used in a combined cycle power plant 100, according to an illustrative embodiment of the present invention. As will be understood by those skilled in the art, the gas turbine 105 includes a compressor 205 and the compressor contains compressor blades 210. The gas turbine 105 also includes a gas intake 215. During the normal operation of the gas turbine 105, gas enters the gas turbine 105 through the gas intake 215 and is compressed in the compressor 205. The gas may contain impurities or foulants such as airborne salt, dirt, or other particles. Foulant deposits will build up on the compressor blades 210 of the gas turbine 105, making it necessary to perform an offline compressor wash of the gas turbine 105.

Figure 3:
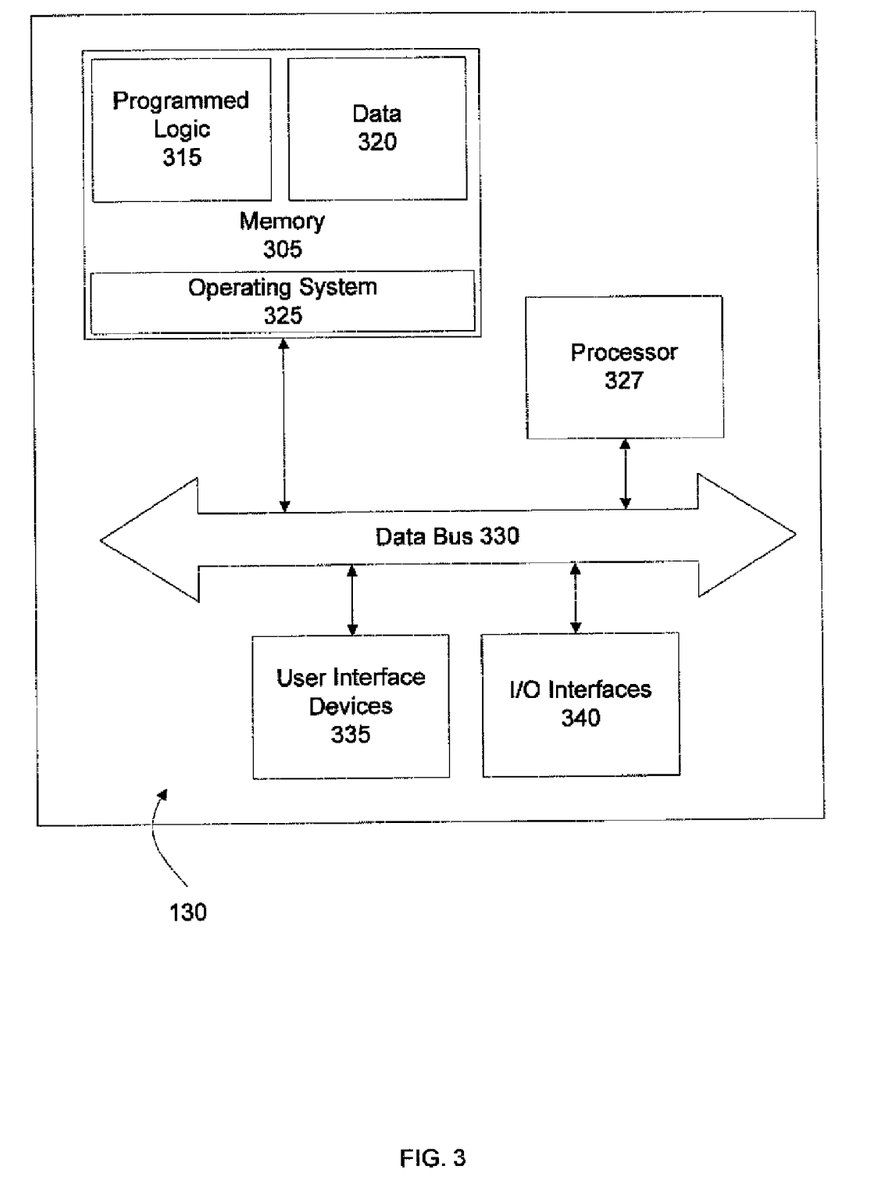
FIG. 3 is a block diagram of a control unit used in a method and system for determining compressor fouling impact, according to an illustrative embodiment of the present invention.

FIG. 3 is a block diagram of a control unit 130 used in a method and system for determining compressor fouling impact, according to an illustrative embodiment of the present invention. The control unit 130 may include a memory 305 that stores programmed logic 315 (e.g., software) in accordance with the present invention. The memory 305 may also include measurement data 320 utilized in the operation of the present invention and an operating system 325. A processor 327 may utilize the operating system 325 to execute the programmed logic 315, and in doing so, may also utilize the measurement data 320. A data bus 330 may provide communication between the memory 305 and the processor 327. Users may interface with the control unit 130 via a user interface device(s) 335 such as a keyboard, mouse, control panel, or any other devices capable of communicating data to the control unit 130. The control unit 130 is in communication with the combined cycle power block 100 and perhaps other external devices via I/O Interfaces 340. In the illustrated embodiment the control unit 130 is located remotely with respect to the combined cycle power block 100, though it may be co-located or even integrated into a combined cycle power block 100. Further the control unit 130 and the programmed logic 315 implemented thereby may comprise software, hardware, firmware or any combination thereof.

Figure 4:
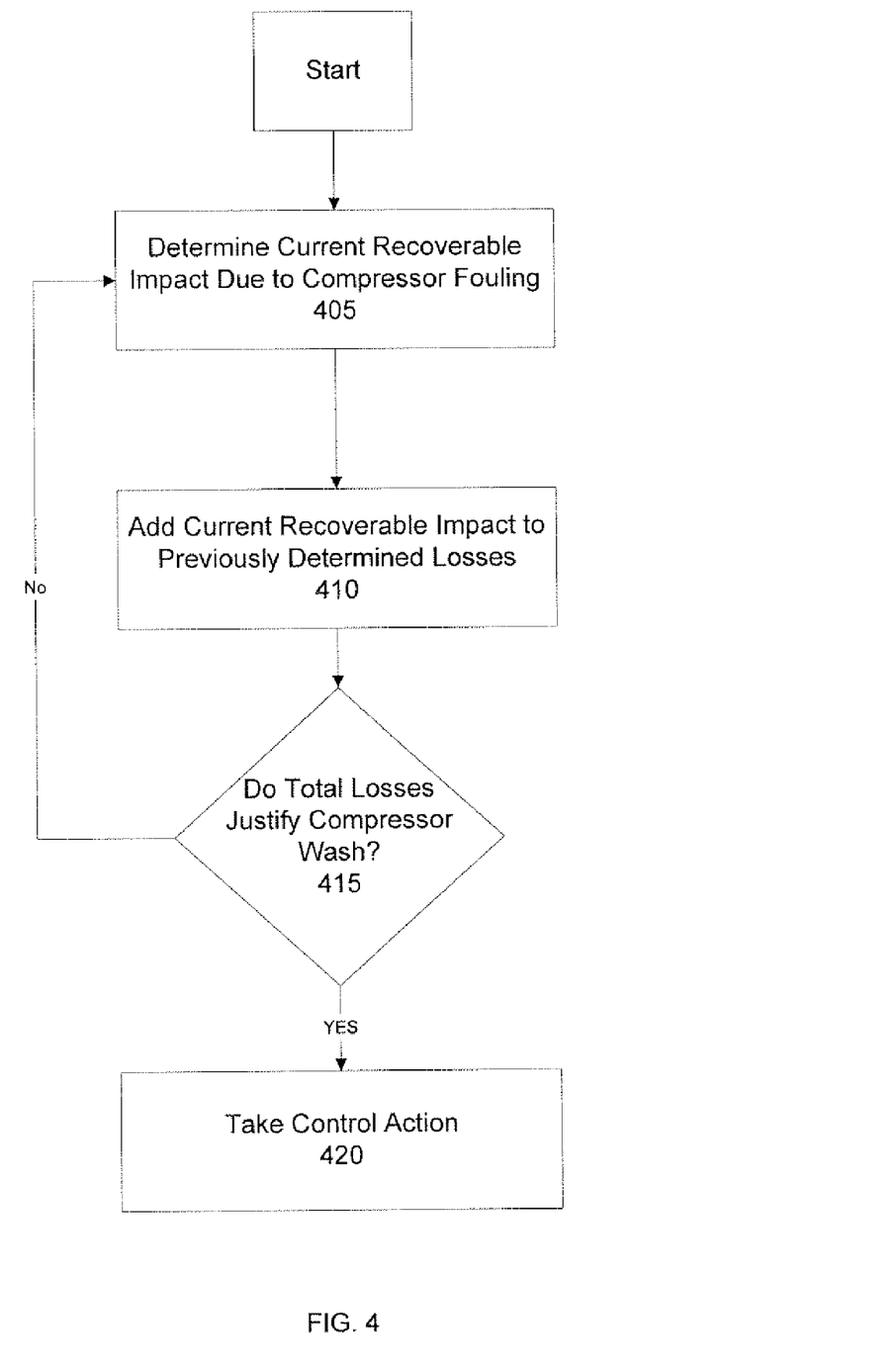
FIG. 4-9 are exemplary flowcharts of the control logic used by the control unit of FIG. 3, according to an illustrative embodiment of the present invention.

FIGS. 4-9 are exemplary flowcharts of the control logic which may be used by the control unit 130, according to an embodiment of the present invention. FIG. 4 is an exemplary flowchart of the basic operation of the control unit 130, according to an aspect of the present invention. For ease in explanation, the operation of the control unit 130 of present invention will be described with reference to the compressor fouling in only one of the gas turbines of the combined cycle power plant; however, it will be understood by those of skill in the art that the control unit 130 may determine the impact due to compressor fouling in any number of gas turbines 105, 110 present in the combined cycle power block 100. Once the control unit 130 is started up, it may enter a basic operational loop. At step 405, the control unit 130 determines the current recoverable impact in the combined cycle power block 100 due to compressor fouling in one of the gas turbines 105. The current recoverable impact due to compressor fouling may take into account the recoverable impact to the capacity and fuel consumption of the combined cycle power block 100. At step 410, the control unit 130 may add the determined current recoverable impact to previously determined recoverable impacts of the combined cycle power block 100 which are due to compressor fouling. These previously determined recoverable impacts may be stored in the memory 305 of the control unit 130 and may be recoverable impacts determined by the control unit 130 since the last offline compressor wash or other major maintenance of the gas turbine 105. After the current recoverable impact is added to the previously determined recoverable impacts, the resulting value may be stored in the memory 305 of the control unit 130.

Next, at step 415, the control unit 130 determines whether or not the total system loss due to compressor fouling in the gas turbine 105 justifies an offline compressor wash of the gas turbine 105. The determination at step 415 may compare the total recoverable impact in the combined cycle power block 100 due to compressor fouling in the gas turbine 105 to a target value established by the operator of the present invention. The target value may dictate an appropriate point at which an offline compressor wash should be performed on the gas turbine 105. It will be understood that the target value may be any recoverable impact due to compressor fouling in the combined cycle power block 100. It will also be understood by those of skill in the art that the determination of whether or not the recoverable impact due to compressor fouling justifies an offline compressor wash may be made by comparing the current recoverable impact of the combined cycle power block 100 to a target value, rather than comparing a summation of recoverable impacts to a target value.

If, at step 415, it is determined that the total system loss due to compressor fouling does not justify an offline compressor wash, then the control unit 130 may return to step 405. It will also be understood by those of skill in the art that a time delay, such as one minute, five minutes, or any other time delay, may be incorporated before the subsequent execution of step 405. In other words, the control unit 130 may iteratively determine the recoverable impact due to compressor fouling until the total recoverable impact justifies an offline compressor wash. For example, the control unit 130 may determine the recoverable impact due to compressor fouling in the gas turbine 105 every five minutes until it is determined that an offline compressor wash is needed. Through this iterative process, the control unit 130 may determine the point in time at which an offline compressor wash of the gas turbine 105 is needed.

If, at step 415, it is determined by the control unit 130 that the total system loss due to compressor fouling justifies an offline compressor wash, then the control unit 130 may take a control action at step 420. In other words, the control unit 130 may determine a point in time at which an offline compressor wash or other maintenance needs to be performed on the gas turbine 105. Possible control actions may include, but are not limited to setting off an alarm, transmitting an alarm signal, scheduling an offline compressor wash, shutting down the gas turbine 105, or shutting down the combined cycle power block 100. Additionally, any determination that an offline compressor wash is needed, as well as any alarms triggered by the control unit 130, may be recorded in the memory 305 of the control unit 130.

It will also be understood that the control unit 130 may be configured to monitor trends in the compressor fouling of the gas turbine 105 in order to predict a future point in time at which an online compressor wash will be needed. In other words, the control unit 130 may predict a future point in time at which the total effects of compressor fouling in the gas turbine 105 will reach the established target value. The control unit 130 may further schedule an offline compressor wash at a future point in time based on its predictions. In other words, at step 415, the control unit 130 may determine at point in time at which a compressor wash of the gas turbine is needed and, at step 420, the control unit 130 may schedule the compressor wash for that time.

Figure 5:
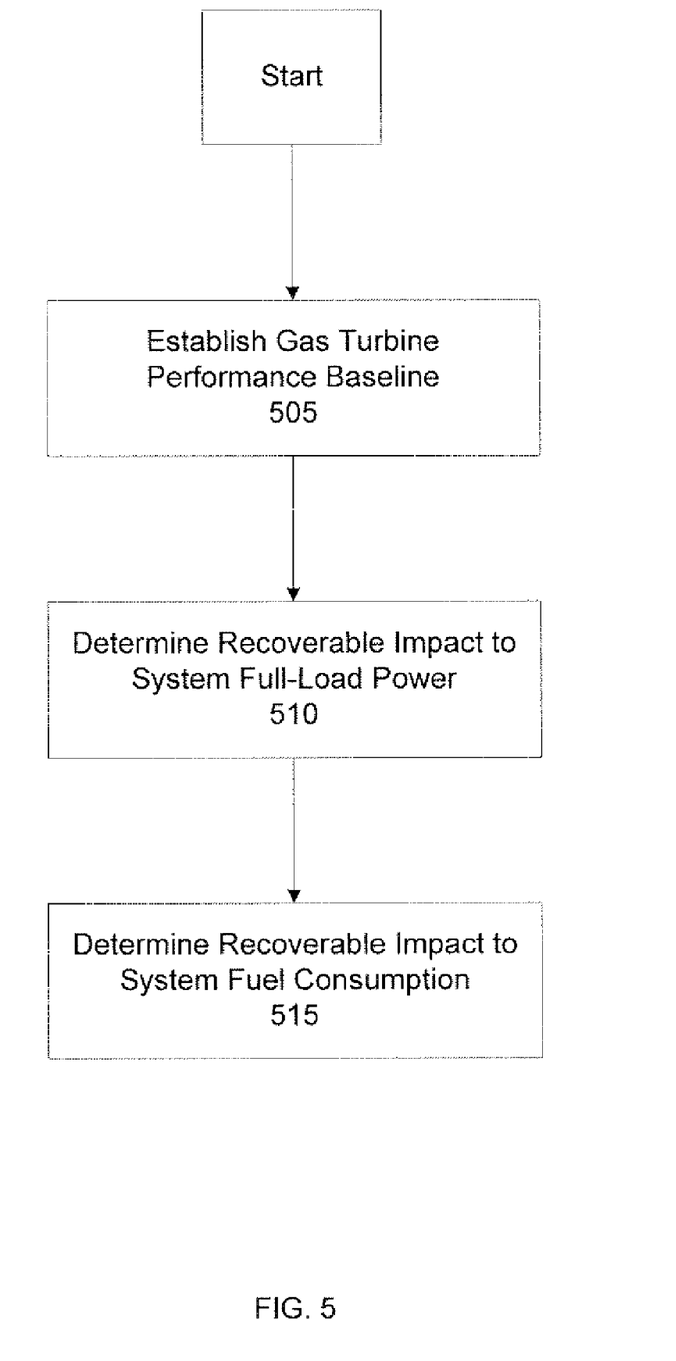

FIG. 5 is an exemplary flowchart of the steps which may be taken by the control unit 130 in determining the current recoverable impact due to compressor fouling, according to an aspect of the present invention. First, at step 505, the control unit 130 may determine a baseline performance for the gas turbine 105. As will be explained in greater detail below with reference to FIG. 6, the determined baseline performance of the gas turbine 105 may be close to the performance of the gas turbine 105 right after the completion of the last offline compressor wash or other major maintenance to the gas turbine 105. Once the baseline performance of the gas turbine 105 has been determined, the control unit 130 determines the recoverable impact to the full-load power of the combined cycle power block 100 at step 510. As will be explained in greater detail below with reference to FIG. 7, the recoverable impact to the full-load power of the combined cycle power block 100 may be determined by subtracting the current full-load power of the combined cycle power block 100 from the full-load power of the combined cycle power block 100 with the gas turbine 105 set to its baseline performance. The determination at step 510 yields the capacity gain which may be obtained in the combined cycle power block 100 by performing an offline compressor wash on the gas turbine 105.

Next, at step 515, the control unit 130 determines the recoverable impact to system fuel consumption in the combined cycle power block 100. As will be explained in greater detail below with reference to FIGS. 8-9, the recoverable impact to system fuel consumption may be determined by subtracting the current fuel consumption of the combined cycle power block 100 from the fuel consumption needed to produce the same system power under the current operating conditions with the gas turbine 105 set to its baseline performance. For example, if the combined cycle power block 100 is currently operated at sixty percent of its capacity, the determination at step 515 will determine the amount of fuel needed to operate the combined cycle power block 100 at sixty percent of its capacity after an offline compressor wash is performed on the gas turbine 105. The determined amount of fuel needed may be subtracted from the current fuel consumption in order to calculate the recoverable impact to fuel consumption due to compressor fouling in the gas turbine 105. Once the recoverable impact to fuel consumption is determined at step 515, the control unit may determine a recoverable impact to fuel cost by multiplying the recoverable impact to fuel consumption by the current fuel price.

Figure 6:
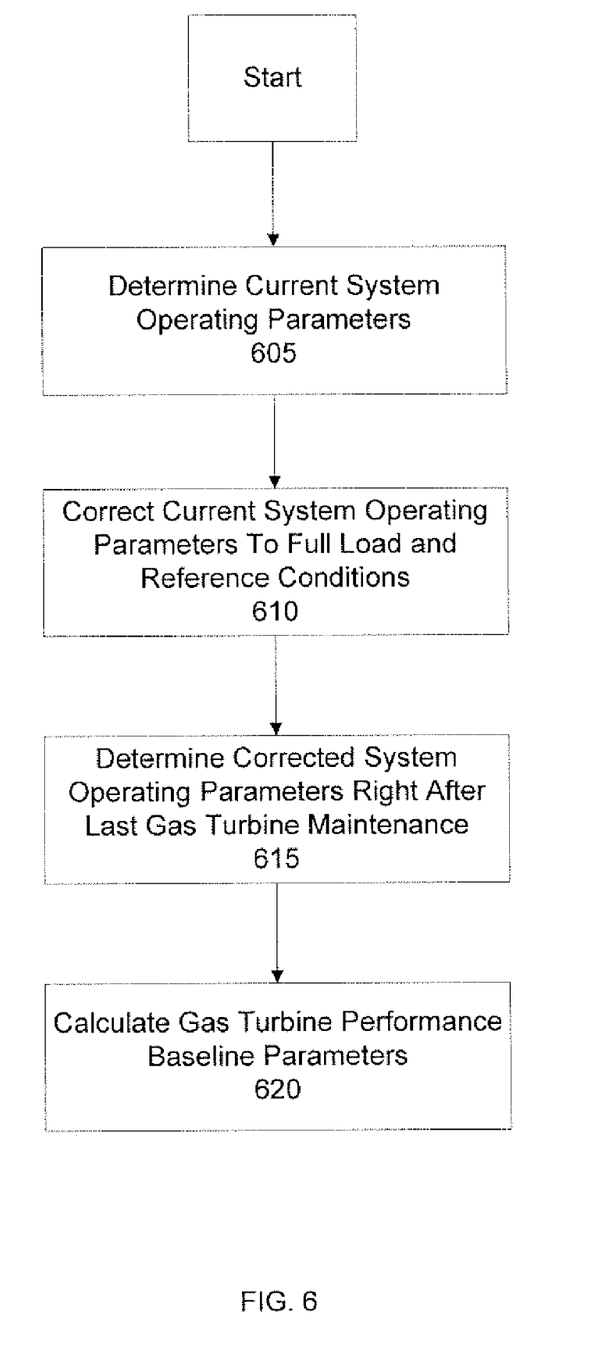

FIG. 6 is an exemplary flowchart of the steps which may be taken by the control unit 130 in determining the baseline performance of the gas turbine 105. At step 605, the control unit 130 determines the current system operating parameters of the gas turbine 105 and the combined cycle power block 100. The current system operating parameters may be used as data variables by the programmed logic 315 of the control unit 130. While only some of the current operating parameters of the gas turbine 105 are needed to determine the baseline performance of the gas turbine 105, for ease of explanation, all of the determined current system operating are described below.

The determined current system operating parameters for the gas turbine 105 may include, but are not limited to the current power output of the gas turbine (GT_PWR_HB), the current heat rate of the gas turbine (GT_HR_HB), the current exhaust temperature of the gas turbine (GT_EXH_T_HB), the current exhaust flow of the gas turbine (GT_EXH_F_HB), the current base load fraction of the gas turbine (GT_BLF), the recovery fraction of the gas turbine due to an offline compressor wash (Recover), the ratio of gas turbine auxiliary power and heat loss, excluding exhaust energy, to the gas turbine power (GT_AUX_Ratio), and the ratio of the gas turbine heat rate at the current base load fraction to the base load heat rate of the gas turbine, under reference conditions (f(BLF)). The GT_BLF may represent the percentage of the base load at which the gas turbine 105 is currently operating, as will be understood by those skilled in the art. Recover represents the amount of degradation in the gas turbine 105 due to compressor fouling that can be recovered by an offline compressor wash. Recover may vary by the specific system involved, the operating environment of the system, and the effectiveness of the offline compressor wash. Thus, according to an aspect of the present invention, Recover may have a default setting which may be changed by a user of the present invention. The default setting of Recover may be 95 percent, or any other fraction of the degradation in the gas turbine 105.

The GT_AUX_Ratio is the ratio of the auxiliary power of the gas turbine 105 plus the heat loss of the gas turbine 105 to GT_PWR_HB. The auxiliary power of the gas turbine is the power required to operate the gas turbine 105 during normal operation, such as the power needed to run the gas pumps of the gas turbine 105, as will be understood by those of skill in the art. The heat loss of the gas turbine 105 includes the loss of thermal energy of the gas turbine 105 into the atmosphere, and it does not include the gas turbine exhaust energy (GT_EXH_Energy), which is described below with reference to FIG. 9. Typically, the GT_AUX_Ratio depends on the design of the gas turbine 105 and can be determined from the specifications of the gas turbine 105. To determine the GT_AUX_Ratio, the ratio of the auxiliary power of the gas turbine 105 to GT_PWR_HB may be added to the ratio of the heat loss of the gas turbine 105 to GT_PWR_HB. For example, the ratio of the auxiliary power of the gas turbine 105 to GT_PWR_HB may be approximately 3.0-4.0%. The ratio of the heat loss of the gas turbine 105 to GT_PWR_HB may be approximately 0.5-1.0%. Accordingly, the GT_AUX_Ratio would be approximately 3.5-5.0%.

The f(BLF) is a function that gives the ratio of gas turbine 105 heat rate at the current base load fraction to the base load heat rate, under reference conditions. The reference conditions may be the reference conditions established by the International Standards Organization (ISO) for power plants, as explained in greater detail below, or the reference conditions may be other reference conditions established by the user or operator of the present invention. Typically, the f(BLF) may be determined from a performance curve of a gas turbine 105 that is generated by the manufacturer or vendor of the gas turbine 105.

Other current operating parameters for the combined cycle power block 100 may also be determined by the control unit 130. These operating parameters may include, but are not limited to the current power output of the combined cycle power block 100 (BL_PWR_HB), the current heat rate of the combined cycle power block 100 (BL_HR_HB), the current power output of one or more steam turbines 125 in the combined cycle power block 100 (ST_PWR_HB), the derivative of steam turbine 125 power with respect to gas turbine 105 exhaust temperature, at full-load and reference conditions (STPWR_EXH_T_Deri), and the derivative of steam turbine 125 power with respect to gas turbine 105 exhaust flow, at full-load and reference conditions (STPWR_EXH_T_Deri). If the combined cycle power block 100 has more than one gas turbine 105. STPWR_EXH_T_Deri and STPWR_EXH_F_Deri may relate to a particular gas turbine 105 in the combined cycle power block 100. The values for STPWR_EXH_T_Deri and STPWR_EXH_F_Deri may also be relatively constant.

The current operating parameters may be measured by monitoring devices (not shown) connected to the combined cycle power block 100. Once measured, the current operating parameters may be electronically transferred to the control unit 130 via a direct or network connection, manually transferred to the control unit 130 via a diskette, CD-ROM, or other storage medium, or manually input into the memory 305 of the control unit 130.

It will be understood in the art that power plant performance is typically measured by corrected parameters, which are output parameters corrected to full load and reference conditions. Accordingly, once the current operating parameters are determined at step 605, the current operating parameters may be corrected to full load and reference conditions at step 610. The current operating parameter may further be corrected to ISO reference standards or they may be corrected to any other reference standards. As established by the ISO, the current reference standards and ambient conditions used by the power plant industry are 59° F./15° C., 14.7 psia/1.013 bar, and 60% relative humidity. It will be understood by those of skill in the art that any reference standards may be used in order to correct the current operating parameters so long as those reference standards are used consistently by the present invention.

At step 610, a portion or all of the current operating conditions of the gas turbine 105 may be corrected to reference conditions. The resulting corrected operating conditions may then be used as data variables by the programmed logic 315 of the control unit 130. According to an aspect of the present invention, GT_PWR_HB may be corrected in order to obtain the current corrected power of the gas turbine 105 (GT_PWR_COR); GT_HR_HB may be corrected in order to obtain the current corrected heat rate of the gas turbine 105 (GT_HR_COR); GT_EXH_T_HB may be corrected in order to obtain the current corrected exhaust temperature of the gas turbine 105 (GT_EXH_T_COR); and GT_EXH_F_HB may be corrected in order to obtain the current corrected exhaust flow of the gas turbine 105 (GT_EXH_F_COR).

At step 615, the control unit 130 determines the corrected operating parameters of the gas turbine 105 immediately following the last offline compressor wash or other major maintenance. These corrected last operating parameters may be stored in the memory 305 of the control unit 130, transferred or transmitted to the control unit 130, or manually input into the control unit 130. According to an aspect of the present invention, the corrected last operating parameters of the gas turbine 105 may include, but are not limited to the corrected power output of the gas turbine 105 immediately after the latest offline compressor wash or major maintenance (GT_PWR_COR_Last), the corrected heat rate of the gas turbine 105 immediately after the latest offline compressor wash or major maintenance (GT_HR_COR_Last), the corrected exhaust temperature of the gas turbine 105 immediately after the latest offline compressor wash or major maintenance (GT_EX_T_COR_Last), and the corrected exhaust flow of the gas turbine 105 immediately after the latest offline compressor wash or major maintenance (GT_EX_T_COR_Last).

Once the control unit 130 has determined the current corrected operating parameters at step 610 and the corrected last operating parameters at step 615, the control unit 130 may determine the gas turbine 105 baseline performance at step 620. The baseline performance of the gas turbine 105 may represent the performance of the gas turbine 105 that would be obtained by performing an offline compressor wash on the gas turbine 105. Because an offline compressor wash almost fully eliminates degradation in the gas turbine 105 due to compressor fouling, the baseline performance of the gas turbine 105 may be close to the performance immediately following the last offline compressor wash or major maintenance on the gas turbine 105. The control unit 130 may calculate the baseline power of the gas turbine 105, or GT_PWR_BAS, according to the formula:

$$GT\_PWR\_BAS = GT\_PWR\_COR + (GT\_PWR\_COR\_Last - GT\_PWR\_COR) * \text{Recover}$$

where the resulting GT_PWR_BAS may represent the corrected power at which the gas turbine 105 might operate following an offline compressor wash of the gas turbine 105. Similarly, the control unit 130 may calculate the baseline heat rate of the gas turbine 105, or GT_HR_BAS, according to the formula.

$$GT\_HR\_BAS = GT\_HR\_COR + (GT\_HR\_COR\_Last - GT\_HR\_COR) * \text{Recover}$$

where the resulting GT_HR_BAS may represent the corrected heat rate at which the gas turbine 105 might operate following an offline compressor wash of the gas turbine 105. The control unit 130 may also calculate the baseline exhaust temperature of the gas turbine 105, or GT_EXH_T_BAS, according to the formula:

$$GT\_EXH\_T\_BAS = GT\_EXH\_T\_COR + (GT\_EXH\_T\_COR\_Last - GT\_EXH\_T\_COR) * \text{Recover}$$

where the resulting GT_EXH_T_BAS may represent the corrected exhaust temperature at which the gas turbine 105 might operate following an offline compressor wash of the gas turbine 105. The control unit 130 may also calculate the baseline exhaust flow of the gas turbine 105, or GT_EXH_F_BAS, according to the formula:

$$GT\_EXH\_F\_BAS = GT\_EXH\_F\_COR + (GT\_EXH\_F\_COR\_Last - GT\_EXH\_F\_COR)*Recover$$

where the resulting GT_EXH_F_BAS may represent the corrected exhaust flow at which the gas turbine 105 might operate following an offline compressor wash of the gas turbine 105.

It will be understood by those of ordinary sill in the art that the baseline performance of the gas turbine 105 may be a prediction of how the gas turbine 105 will perform following an offline compressor wash. Rather than using the method described above to calculate the gas turbine 105 baseline performance or a similar method, the baseline performance of the gas turbine 105 may be predicted by a system model. An example of such a system model is GateCycle™, which is offered by General Electric Company, although other system models may be capable of predicting the baseline performance of the gas turbine 105.

Figure 7:
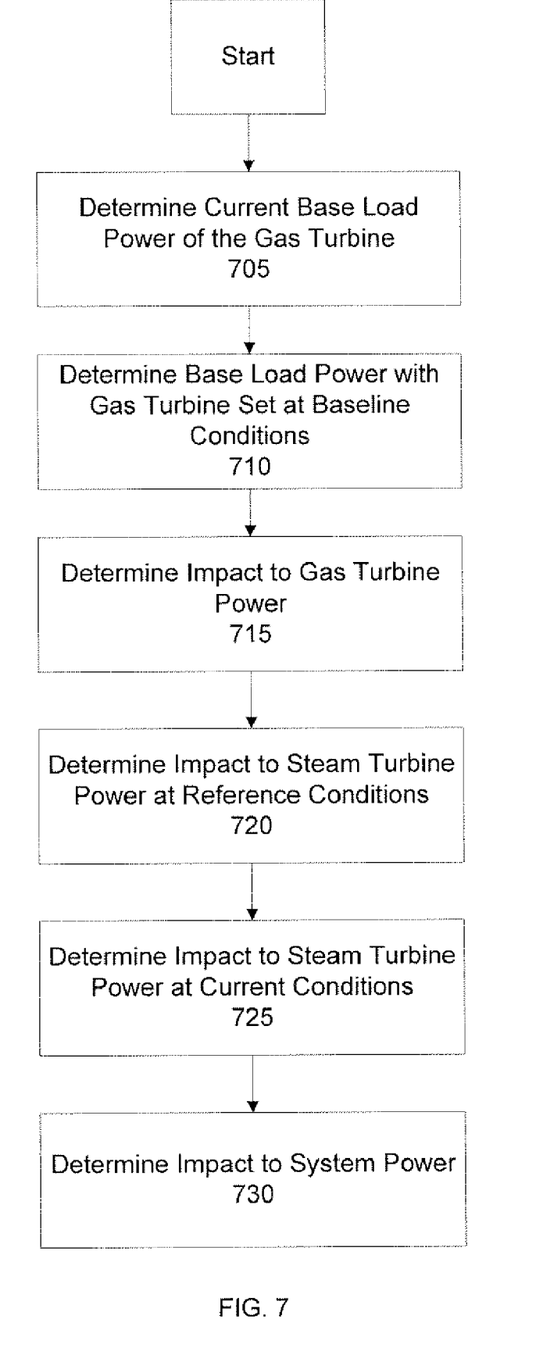

After the control unit 130 has determined the baseline performance of the gas turbine 105, the control unit 130 may determine the recoverable impact to the full load power of the combined cycle power block 100 attributable to compressor fouling in the gas turbine 105. FIG. 7 is an exemplary flowchart of the steps which may be taken by the control unit 130 in determining the recoverable impact to the full load power of the combined cycle power block 100. The control unit 130 firsts determines the recoverable impact to the full load power of the gas turbine 105 and then determines how the recoverable impact to the gas turbine 105 affects the rest of the combined cycle power block 100. At step 705, the control unit 130 may determine the current base load power of the gas turbine 105. The control unit 130 may determine the current base load power of the gas turbine 105 according to the following formula:

$$GT\_PWR\_FullLoad = \frac{GT\_PWR\_HB}{GT\_BLF}$$

where GT_PWR_HB is the current power output of the gas turbine 105 and GT_BLF is the current base load fraction of the gas turbine 105. Then, at step 710, the control unit 130 may determine what the base load power of the gas turbine 105 would be after an offline compressor wash. In other words, the control unit 130 may determine the base load power of the gas turbine 105 with the gas turbine 105 set to its baseline conditions. In doing so, the control unit 130 may use the following formula:

$$GT\_Baseload\_PWR\_Clean = GT\_PWR\_FullLoad * \frac{GT\_PWR\_BAS}{GT\_PWR\_COR}$$

where GT_PWR_BAS is the baseline power of the gas turbine 105 and GT_PWR_COR is the current corrected power of the gas turbine 105.

Once the current base load power of the and the base load power following an offline compressor wash have been determined by the control unit 130, the gas turbine 105 recoverable impact due to compressor fouling may be determined at step 715 according to the following formula:

$$GT\_PWR\_Impact = GT\_Baseload\_PWR\_Clean - GT\_PWR\_FullLoad$$

which may be rewritten as:

$$GT\_PWR\_Impact = \frac{GT\_PWR\_HB}{GT\_BLF} * \left(\frac{GT\_PWR\_BAS}{GT\_PWR\_COR} - 1\right)$$

Following the determination of the gas turbine 105 recoverable impact at step 715, the control unit 130 may determine the recoverable impact to a steam turbine 125 in the combined cycle power block 100 at steps 720 and 725. At step 720, the control unit 130 may determine the recoverable impact to a steam turbine 125 under the established reference conditions. According to an aspect of the present invention, the control unit 130 may determine the recoverable impact to a steam turbine 125 under the reference conditions, or ST_PWR_IMP_BAS, by utilizing the following formula:

$$ST\_PWR\_IMP\_BAS = STPWR\_EXH\_T\_Deri * (GT\_EXH\_T\_BAS - GT\_EXH\_T\_COR) + STPWR\_EXH\_F\_Deri * (GT\_EXH\_F\_BAS - GT\_EXH\_F\_COR)$$

where ST_PWR_EXH_T_Deri is the derivative of steam turbine 125 power with respect to the gas turbine 105 exhaust temperature and ST_PWR_EXH_F_Deri is the derivative of steam turbine 125 power with respect to gas turbine 105 exhaust flow. Both ST_PWR_EXH_T_Deri and ST_PWR_EXH_F_Deri may take into account the full load and reference conditions of the combined cycle power block 100. At step 725, the control unit 130 may determine the recoverable impact to a steam turbine 125 under system full load at the current operating conditions, or ST_PWR_Impact, according to the following formula:

$$ST\_PWR\_Impact = \frac{GT\_PWR\_HB}{GT\_BLF} * \frac{ST\_PWR\_IMP\_BAS}{GT\_PWR\_BAS}$$

It will be understood by those of ordinary sill in the art that the prediction of the steam turbine 125 performance based on a baseline gas turbine 105 performance may be accomplished with a system model, such as GateCycle™, offered by the General Electric Company, as an alternative to the algorithm described above.

With continued reference to FIG. 7, once the recoverable impact to the gas turbine 105 and steam turbine 125 have been determined, the control unit 130 may determine the recoverable impact to the full load power of the combined cycle power block 100 at step 730. The recoverable impact to the full load power of the combined cycle power block 100, or BL_PWR_Impact, represents the performance increase in the combined cycle power block 100 that may be obtained by performing an offline compressor wash on the gas turbine 105, and it may be determined according to the following formula:

$$BL\_PWR\_Impact = GT\_PWR\_Impact + ST\_PWR\_Impact$$

Figure 8:
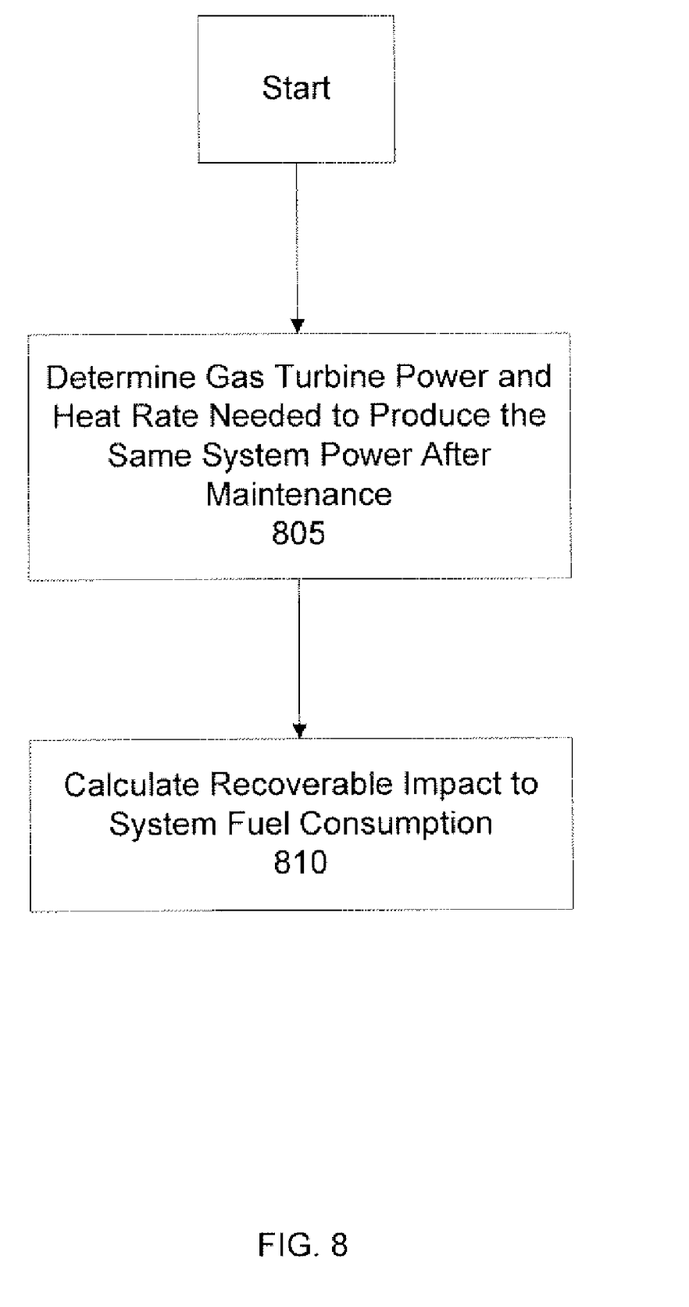

FIG. 8 is an exemplary flowchart of the steps which may be taken by the control unit 130 in determining the recoverable impact to fuel consumption of the combined cycle power block 100. After an offline compressor wash is performed on the gas turbine 105, the gas turbine 105 may generate power more efficiently. It may be desirable, however, to maintain the overall output of the combined cycle power block 100 at a relatively constant level after the offline compressor wash. Therefore, at step 805, the control unit 130 may determine the gas turbine 105 power and heat rate that are needed after an offline compressor wash has been performed on the gas turbine 105 in order to produce the came current output in the combined cycle power block 100. The determination at step 805 may be performed by the control unit 130 according to the steps described below with reference to FIG. 9 or, alternatively, the determination at step 805 may be performed by using a system model such as GateCycle™, offered by the General Electric Company.

The needed gas turbine 105 power and heat rate after the online compressor wash will be referred to by the variables GT_PWR_Clean and GT_HR_Clean respectively. After GT_PWR_Clean and GT_HR_Clean are determined, the control unit 130 may determine the recoverable impact to system fuel consumption at step 810. The recoverable impact to system fuel consumption represents the fuel savings which may be obtained by an offline compressor wash of the gas turbine 105, and may be determined with the following formula:

$$BL\_Fuel\_Impact = ((GT\_PWR\_HB)*(GT\_HR\_HB) - (GT\_PWR\_Clean*GT\_HR\_Clean))$$

Once the recoverable impact to system fuel consumption is determined by the control system 130, the fuel costs savings obtainable by performing an offline compressor wash may be determined by multiplying the recoverable impact to system fuel consumption by the current price of fuel. The control unit 130 may then use either the determined recoverable impact to system fuel consumption or the determined fuel costs savings in later determinations concerning whether an offline compressor wash of the gas turbine 105 is desirable.

Figure 9:
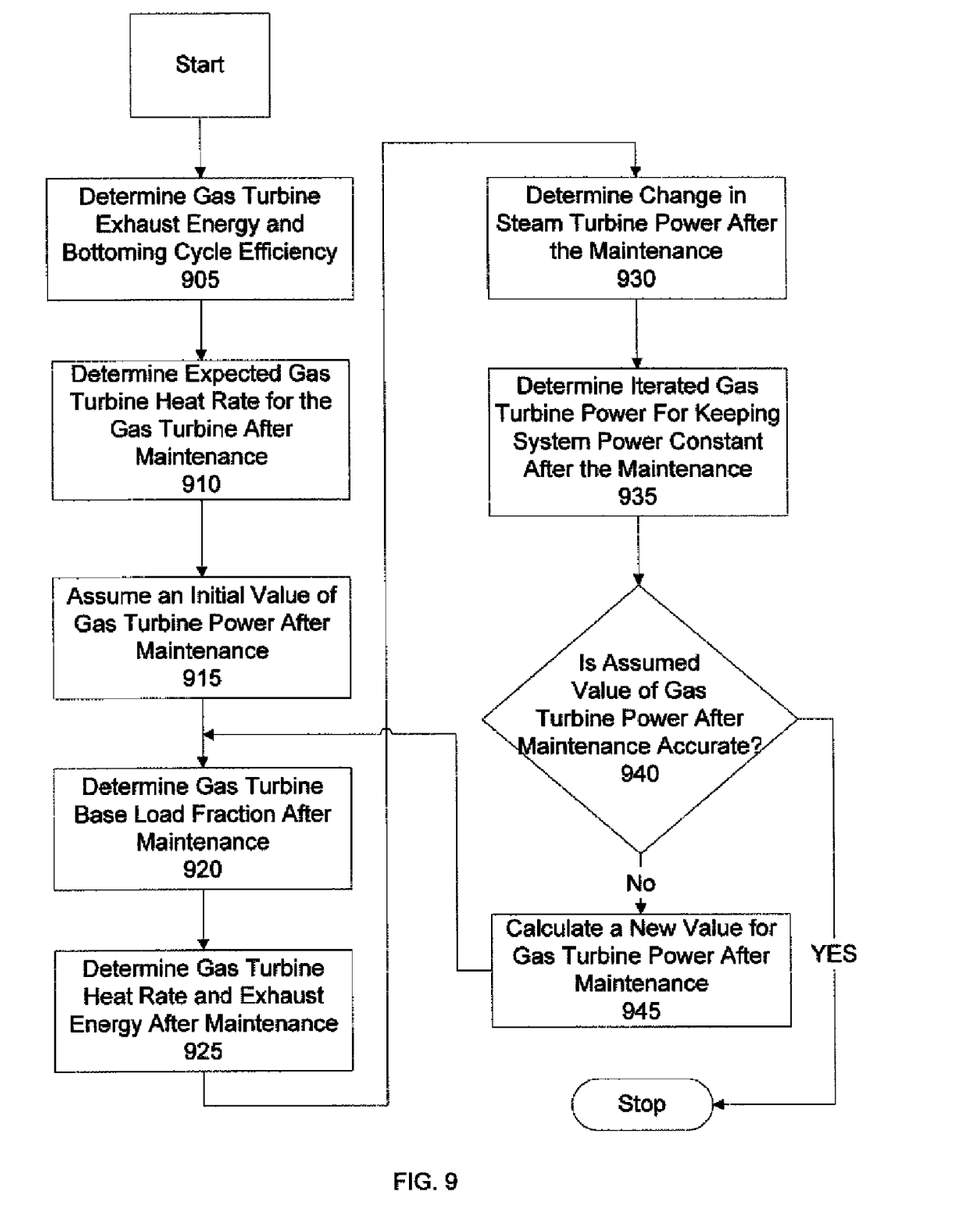

FIG. 9 is an exemplary flowchart of the steps that may be taken by the control unit 130 in determining the gas turbine 105 power and heat rate needed to produce the same power in the combined cycle power block 100 after an offline compressor wash or other major maintenance is performed on the gas turbine 105. At step 905, the control unit determines the current gas turbine 105 exhaust enthalpy and bottoming cycle efficiency. The current exhaust enthalpy of the gas turbine 105 (GT_EXH_Energy_HB) may be determined by utilizing the following formula:

$$GT\_EXH\_Energy\_HB = GT\_PWR\_HB * \left(GT\_HR\_HB * \frac{1.054}{3600} - 1 - GT\_AUX\_Ratio\right)$$

The bottoming cycle efficiency of the gas turbine 105 ($\eta_{bottom}$) represents the efficiency of the rest of the combined cycle power block 100 in converting the exhaust of the gas turbine 105 into additional power. $\eta_{bottom}$ may be determined according to the following formula:

$$\eta bottom = \frac{ST\_PWR\_HB}{\sum_{ANGT} GT\_PWR\_HB * \left(GT\_HR\_HB * \frac{1.054}{3600} - 1 - GT\_AUX\_Ratio\right)}$$

where the GT_HR_HB represents the current heat rate of each gas turbine 105, 110 in the combined cycle power block 100, and a summation is made over all of the gas turbines 105, 110 in the combined cycle power block 100. GT_HR_HB may be determined by control unit 130 based on data received from monitoring devices or alternatively, it may be determined by a system model such as GateCycle™, which is offered by General Electric Company. It will also be understood by those of ordinary skill in the art that $\eta_{bottom}$ may be estimated from design data of the components of the combined cycle power block 100. In both the equation for the current exhaust enthalpy and the equation for the bottoming cycle efficiency, a conversion factor may be used to change the units of GT_HR_HB from Btu/kilowatt-hour to a non-dimensional unit. The conversion factor may be 1.054/3600. It will be understood that a different conversion factor may be used if different units are involved in the determination of GT_HR_HB.

After GT_EXH_Energy and $\eta_{bottom}$ are determined, at step 910, the control unit 130 determines the expected heat rate for the gas turbine 105 following an offline compressor wash or other major maintenance. The determined expected heat rate (GT_HR_EXP) may assume that the gas turbine 105 is operating at the same base load fraction after an offline compressor wash at which the gas turbine 105 is currently operating. At step 910, GT_HR_EXP may be determined by utilizing the following formula:

$$GT\_HR\_EXP = GT\_HR\_HB * \frac{GT\_HR\_BAS}{GT\_HR\_COR}$$

After step 910, the control unit 130 may perform an iterative process in which it assumes an initial value for the output of the gas turbine 105 following an offline compressor wash (GT_PWR_Clean) and then later checks to see if that assumed value is within an established tolerance. The tolerance may be a tolerance established by a user of the present invention or the tolerance may be a default value stored in the memory 305 of the control unit 130, such as 0.1%. At step 915, the control unit 130 may assume an initial value of GT_PWR_Clean. Then, at step 920, the control unit 130 may determine the base load fraction of the gas turbine 105 at the new gas turbine 105 output (GT_BLF_New) according to the following formula:

$$GT\_BLF\_New = GT\_BLF * \frac{GT\_PWR\_Clean}{GT\_PWR\_HB} * \frac{GT\_PWR\_COR}{GT\_PWR\_BAS}$$

Because heat rate may be estimated if power is known, the corresponding heat rate of the gas turbine (GT_HR_Clean) may then be determined by the control unit 130 at step 925 according to the following formula:

$$GT\_HR\_Clean = GT\_HR\_EXP * \frac{f(GT\_BLF\_New)}{f(GT\_BLF)}$$

where the function f(BLF) gives the ratio of the gas turbine 105 heat rate at base load fraction to the base load heat rate of the gas turbine 105, under reference conditions. The control unit 130 may also determine the corresponding exhaust enthalpy of the gas turbine (GT_EXH_Energy_Clean) according to the following formula:

$$GT\_EXH\_Energy\_Clean = GT\_PWR\_Clean * \\ \left(GT\_HR\_Clean * \frac{1.054}{3600} - 1 - GT\_AUX\_Ratio\right)$$

where 1.054/3600 is a conversion factor used to change the units of GT_HR_Clean from Btu/kilowatt-hour to a non-dimensional unit. It will be understood that a different conversion factor may be used if different units are involved in the determination of GT_HR_Clean.

After the various operating parameters following an offline compressor wash are determined for the gas turbine 105, the control unit 130 may determine the effect that the clean gas turbine 105 will have on a steam turbine 125 being powered by the exhaust from the gas turbine 105. At step 930, the control unit 130 may determine the change in steam turbine 125 power (ST_PWR_Change) according to the following formula:

$$ST\_PWR\_Change=(GT\_EXH\_Energy\_Clean-GT\_EXH\_Energy)*n\text{bottom}$$

Then, at step 935, the control unit 130 may recalculate the gas turbine 105 power needed to maintain the same output in the combined cycle power block 100 after an offline compressor wash is performed on the gas turbine 100. The recalculated gas turbine 105 power (GT_PWR_Iter) may be determined according to the following formula:

$$GT\_PWR\_Iter=GT\_PWR\_HB-ST\_PWR\_Change$$

Once the gas turbine 105 power following an offline compressor wash is recalculated, the two determined values for the gas turbine 105 power following an offline compressor wash, GT_PWR_Clean and GT_PWR_Iter, may be compared to one another. At step 940, the control unit 130 may determine whether any discrepancy between GT_PWR_Clean and GT_PWR_Iter are within the established tolerance according to the following formula:

$$\frac{(GT\_PWR\_Iter - GT\_PWR\_Clean)}{GT\_PWR\_Iter} \geq \text{tolerance}$$

If any discrepancy between GT_PWR_Iter and GT_PWR_Clean is within the established tolerance, then the assumed value of GT_PWR_Clean is accurate and that value may be used to determine the recoverable impact to fuel consumption in the combined cycle power block 100 at step 810. If however, any discrepancy between GT_PWR-Iter and GT_PWR_Clean is greater than the established tolerance, then a new value of GT_PWR_Clean may be assumed at step 945 according to the following formula:

$$GT\_PWR\_Clean = \frac{GT\_PWR\_Iter + GT\_PWR\_Clean}{2}$$

Then, the control unit 130 may return to step 920 and repeat steps 920-940 in order to determine whether the new assumed value for GT_PWR_Clean is accurate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for estimating compressor fouling impact in a combined cycle power block, the method comprising:
   determining a current performance of the combined cycle power block, the current performance comprising a performance of a gas turbine included in the combined cycle power block;
   normalizing the current performance of the combined cycle power block to one or more reference conditions;
   determining a baseline performance of the gas turbine utilizing stored predicted performance data associated with the gas turbine, wherein the determined baseline performance is indicative of a potential performance of the gas turbine that can be obtained by completing an offline compressor wash of the gas turbine;
   determining a predicted performance of the combined cycle power block utilizing the normalized current performance of the combined cycle power block with the performance of the gas turbine set to the determined baseline performance of the gas turbine;
   calculating a recoverable impact to the current performance of the combined cycle power block due to compressor fouling in the gas turbine based at least in part on subtracting the normalized current performance of the combined cycle power block from the predicted performance of the combined cycle power block; and
   calculating a recoverable impact to a fuel consumption of the combined cycle power block based on the calculated recoverable impact to the performance of the combined cycle power block.

2. The method of claim 1, wherein determining a baseline performance of the gas turbine comprises:
   determining a performance of the gas turbine at a point in time close to and following a most recent maintenance of the gas turbine; and
   normalizing the determined performance of the gas turbine to the one or more reference conditions.

3. The method of claim 2, further comprising:
   adjusting the baseline performance of the gas turbine according to a recovery variable.

4. The method of claim 1, wherein the current performance of the combined cycle power block comprises a current performance of the gas turbine and a current performance of at least one steam turbine.

5. The method of claim 4, wherein the current performance of the gas turbine is determined by at least one of: a current power output of the gas turbine, a current heat rate of the gas turbine, a current exhaust temperature of the gas turbine, or a current exhaust flow of the gas turbine.

6. The method of claim 4, wherein the current performance of the at least one steam turbine is determined by at least one of: a current power output of the at least one steam turbine, a derivative of steam power produced with respect to an exhaust temperature of the at least one gas turbine, or a derivative of steam power produced with respect to an exhaust flow of the at least one gas turbine.

7. The method of claim 1, wherein the one or more reference conditions are defined by a user.

8. The method of claim 1, further comprising:
determining a point in time in which maintenance needs to be performed on the gas turbine.

9. The method of claim 8, further comprising:
taking a corrective action based at least in part on the determination of the point in time, wherein the corrective action comprises one of setting off an alarm, transmitting an alarm signal, shutting off the gas turbine, or scheduling a maintenance of the gas turbine.

10. The method of claim 1, wherein calculating a recoverable impact to fuel consumption comprises:
determining a performance of the gas turbine following a proposed maintenance to the gas turbine;
calculating a fuel consumption of the gas turbine following the proposed maintenance; and
subtracting the calculated fuel consumption of the gas turbine from a current fuel consumption of the gas turbine.

11. A system for estimating compressor fouling impact in a combined cycle power block, the system comprising:
one or more monitoring devices coupled to a combined cycle power block comprising at least one gas turbine, the one or more monitoring devices operable to collect current performance data associated with the combined cycle power block;
a control unit in communication with the one or more monitoring devices and operable to receive the current performance data collected by the one or more monitoring devices, the control unit further comprising:
a memory operable to store the received current performance data, predicted performance data for the combined cycle power block, and computer-executable instructions; and
a processor operable to execute the computer-executable instructions to:
determine, based at least in part on the received current performance data, a current performance of the combined cycle power block;
normalize the current performance of the combined cycle power block to one or more reference conditions;
determine, based at least in part on the stored predicted performance data, a predicted performance of the combined cycle power block, wherein the predicted performance is indicative of the performance of the combined cycle power block with the performance of the gas turbine set to a potential performance that can be obtained by completing an offline compressor wash of the gas turbine;
calculate a recoverable impact to the performance of the combined cycle power block due to compressor fouling in the gas turbine based at least in part on subtracting the normalized current performance of the combined cycle power block from the predicted performance of the combined cycle power block; and
calculate a recoverable impact to a fuel consumption of the combined cycle power block based on the calculated recoverable impact to the performance of the combined cycle power block.

12. The system of claim 11, wherein the processor is operable to determine the predicted performance of the combined cycle power block based at least in part on determining a predicted performance of the gas turbine by:
determining a performance of the gas turbine at a point in time close to and following a most recent maintenance of the gas turbine; and
normalizing the determined performance of the gas turbine to one or more reference conditions.

13. The system of claim 12, wherein the processor is further operable to adjust the predicted performance of the gas turbine according to a recovery variable.

14. The system of claim 11, wherein the current performance of the combined cycle power block comprises a current performance of the gas turbine and a current performance of at least one steam turbine.

15. The system of claim 14, wherein the current performance of the gas turbine is determined by at least one of: a current power output of the gas turbine, a current heat rate of the gas turbine, a current exhaust temperature of the gas turbine, or a current exhaust flow of the gas turbine.

16. The system of claim 14, wherein the current performance of the at least one steam turbine is determined by at least one of: a current power output of the at least one steam turbine, a derivative of steam power produced with respect to an exhaust temperature of the at least one gas turbine, or a derivative of steam power produced with respect to an exhaust flow of the at least one gas turbine.

17. The system of claim 11, wherein the one or more reference conditions are defined by a user.

18. The system of claim 11, wherein the processor is further operable to determine a point in time in which maintenance needs to be performed on the gas turbine.

19. The system of claim 18, wherein the processor is further operable to take a corrective action based at least in part on the determination of the point in time, wherein the corrective action comprises one of setting off an alarm, transmitting an alarm signal, shutting off the gas turbine, or scheduling a maintenance of the gas turbine.

20. The system of claim 11, wherein the processor is operable to calculate a recoverable impact to fuel consumption by:
determining a performance of the gas turbine following a proposed maintenance to the gas turbine;
calculating a fuel consumption of the gas turbine following the proposed maintenance; and
subtracting the calculated fuel consumption of the gas turbine from a current fuel consumption of the gas turbine.

* * * * *